Figure 1:
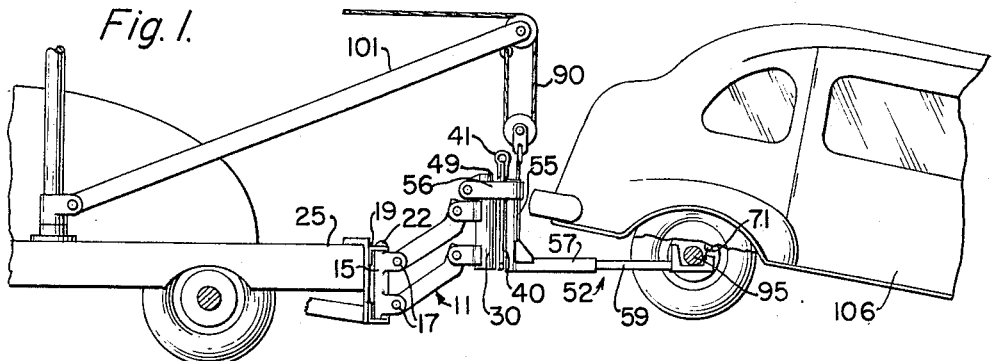

Nov. 15, 1966  R. J. GAUMONT  3,285,443
TOWING DEVICE

Filed Sept. 9, 1964  2 Sheets-Sheet 1

INVENTOR:
RICHARD J. GAUMONT,
BY Edward A. Sokolski
ATTORNEY.

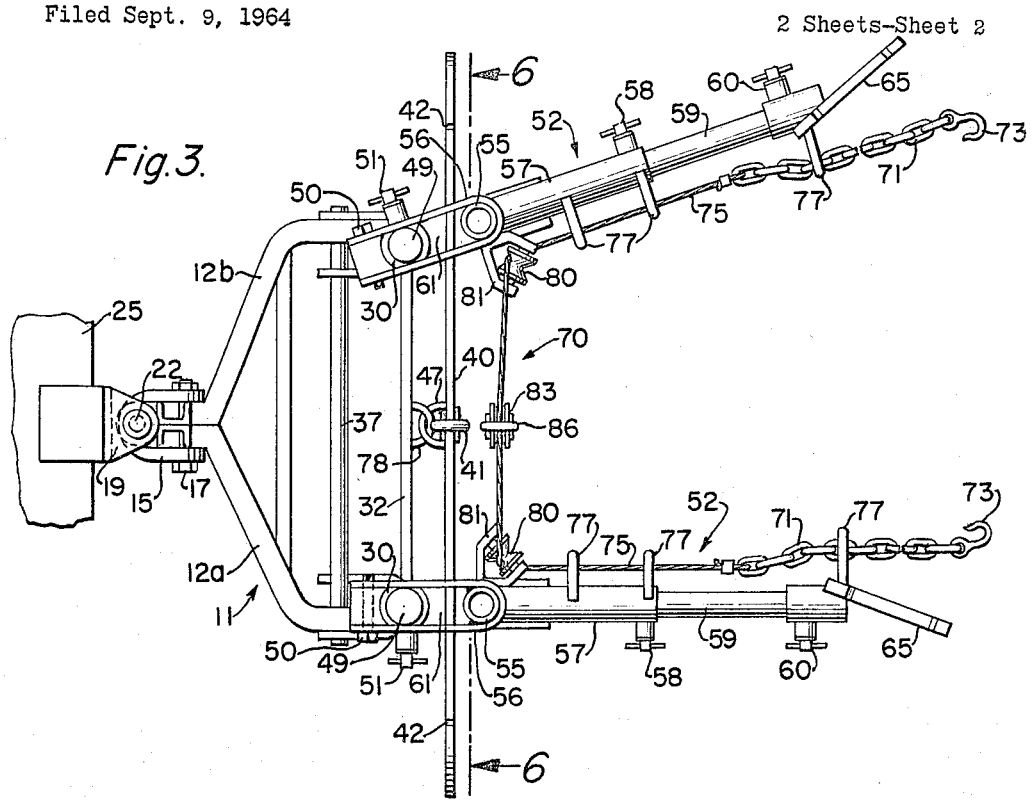
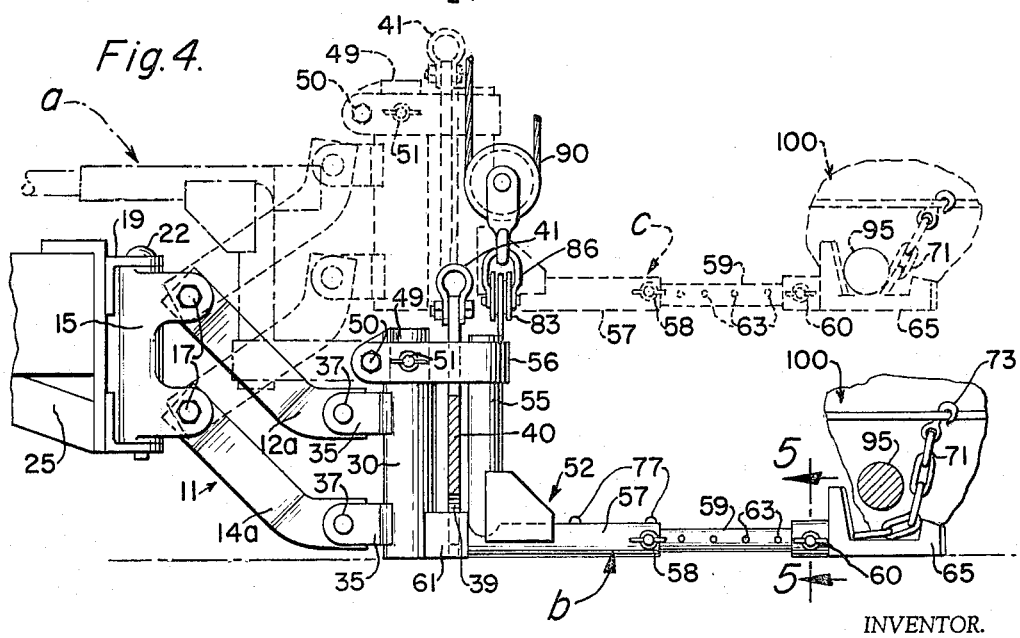
INVENTOR.
RICHARD J. GAUMONT,
BY Edward A. Sokolski
ATTORNEY.

United States Patent Office 3,285,443
Patented Nov. 15, 1966

3,285,443
TOWING DEVICE
Richard J. Gaumont, 7906 Bleriot Ave.,
Los Angeles, Calif.
Filed Sept. 9, 1964, Ser. No. 395,151
16 Claims. (Cl. 214—86)

This invention relates to a towing device and more particularly to such a device suitable for use in hoisting and towing automobiles with a tow truck.

In the handling of disabled automobiles with a tow truck, two general types of hitching devices are utilized. The first of these utilizes a plate which is attached by means of chains to the frame of the automobile. The plate in turn is attached to the tow truck boom by means of a hook and then when the plate is raised by the boom, the car is lifted with the plate braced against the bumper. This type of device subjects the bumper and surrounding parts to a good deal of force and except in the case of automobiles having extremely rugged construction tends to cause damage thereto. This type of hitch is therefore generally only used on badly damaged or old cars or if used on newer cars requires considerable care and auxiliary equipment. To avoid such damage to the bumper regions of the automobile, a second type of lift mechanism generally known as a "cradle" is sometimes utilized. Cradle-type devices of the prior art are generally rectangular in shape and are extended under the frame of the car where they are attached thereto. The cradle is then lifted by the boom without applying any force on the bumper portions of the automobile. This type of cradle mechanism, while effective in avoiding damage to the automobile, has several disadvantages. First, in making attachment to the tow with such units of the prior art, it is essential that the tow truck be precisely aligned with the frame of the car to be towed, and such positioning takes a good deal of skill. Secondly, such units are generally arranged so that it takes a good deal of time to set them in place and attach them to the car. Further, it takes a considerable amount of physical strength for the operator to position most of the units now available. Thus, while the use of a cradle-type unit minimizes the possibility of damage to an automobile in a towing operation, such units of the prior art, in view of the skill and time required for their use, are rather expensive to utilize.

As already noted, there are some instances where a simple bumper hitch can be utilized and others where the cradle type unit is required. With towing devices of the prior art, such alternative type of operation is possible but involves a considerable amount of time and effort to convert from simple bumper hitch type operation to a cradle type configuration.

The device of this invention overcomes the shortcomings of prior art towing devices in providing a simple yet highly efficient unit that can be operated alternatively either as a simple bumper hitch or as a cradle unit. Conversion from one type of operation to the other can be effected in a relatively short period of time by a few simple steps. The cradle unit of the device of the invention requires relatively little skill to operate in view of the fact that the necessity for precisely aligning the tow truck with the automobile to be towed is obviated, it being possible to achieve proper attachment of the cradle mechanism to the tow by only bringing the tow truck into a general towing position. Further, little strength is required to place the unit in position and operate it, and in view of the minimization of the manual operations required, a greater degree of safety is afforded.

The improvement is achieved in the device of the invention by utilizing a cradle unit comprising a pair of cradle arms which are separately pivotally mounted for both vertical and horizontal rotation on a support unit which is attached to the tow truck. A bumper lift plate is also attached to the support unit in a manner providing some degree of freedom relative thereto. Pull means such as, for example, a cable or chain or a combination of both runs along the longitudinal extent of each of the cradle arms and is constrained relative thereto except as to motion along the longitudinal axes of such arms, the center portion of said pull means which is towards the inner ends of said arms being attached to pulley means. When it is desired to use the bumper lift plate, the cradle arms are pivotally swung up over towards the back of the truck and the tow truck boom is attached by suitable means to the lift plate. When it is desired to use the cradle unit, the cradle arms are swung out to the desired position and the tow truck boom lift cable is removed from the lift plate and attached to the pulley means associated with the cradle arm pull means. With the free ends of the pull means attached to the vehicle to be towed, the cradle is then utilized to lift the tow in position by drawing upwards on the pull means by means of the tow truck lift mechanism.

It is therefore an object of this invention to provide an improved towing device.

It is a further object of this invention to provide a towing device which can be alternatively operated either in a bumper lift configuration or a cradle configuration with a minimum amount of time and effort being involved in converting from one type of operation to the other.

It is still a further object of this invention to provide a cradle type of hitching device with which precise alignment of the tow truck is not required.

It is still another object of this invention to provide a cradle type tow device requiring less skill to operate than similar prior art devices.

It is still a further object of this invention to minimize the time required to connect a cradle type hitching device to a tow.

Figure 2:
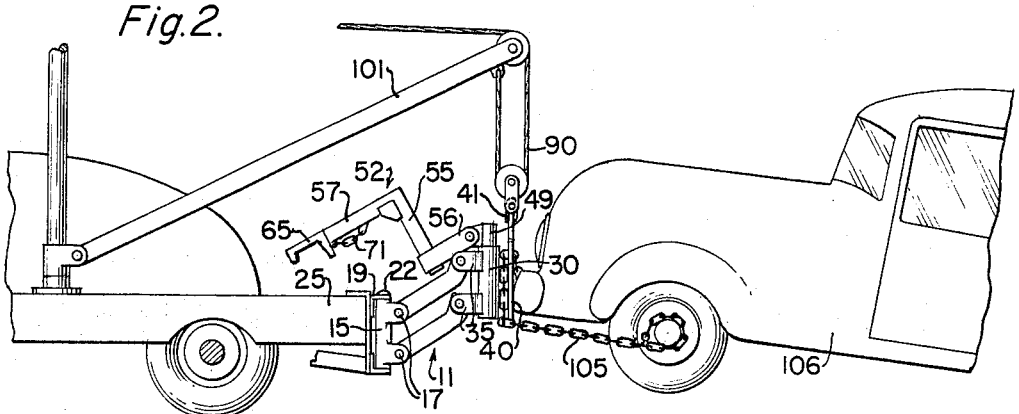
Figure 5:
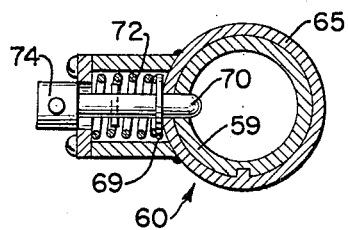
Figure 6:
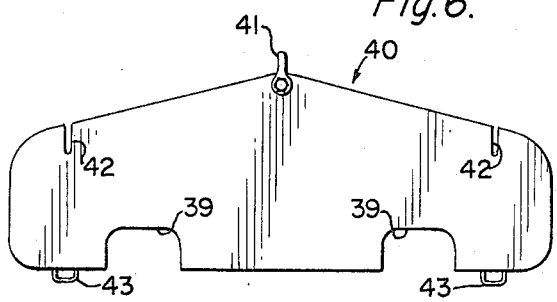

Other objects of this invention will become apparent from the following description taken in connection with the accompanying drawings of which:

FIG. 1 is an elevation view illustrating the utilization of the cradle lift mechanism of the device of the invention, FIG. 2 is an elevation view illustrating the utilization of the bumper lift mechanism of the device of the invention, FIG. 3 is a top plan view of a preferred embodiment of the device of the invention, FIG. 4 is an elevation view of the embodiment shown in FIG. 3, FIG. 5 is a cross-sectional view of the locking pin mechanism utilized in the device of the invention as taken along the plane indicated by the line 5—5 in FIG. 4, and FIG. 6 is a view of the bumper lift plate of the device of the invention as taken along the plane indicated by the line 6—6 in FIG. 3.

Referring now particularly to FIGS. 3 and 4, support member 11 includes an upper pair of arms 12a, 12b, and a lower pair of arms 14a and an arm opposite 14a (not shown). Each of these pairs of arms is joined together at one end thereof by any suitable means such as, for example, welding, and at this juncture point are pivotally attached to post member 15 by means of pivot pins 17. Post 15 is attached to hitching bracket 19 by means of pin 22 for pivotal motion about the longitudinal axis of pin 22. Hitching bracket 19 is fixedly attached to the end of tow truck 25 by welding or any other suitable means.

Support member 11 also includes a pair of post members 30, such post members being joined together by cross member 32. Cross member 32 is fixedly attached to the post members 30 by welding or any other suitable means. Arms 12a, 12b and 14a and its paired arm are each pivotally attached to an associated bracket 35 by means of a respective rod 37. Brackets 35 are fixedly attached to posts 30 by welding. The arms are thus articulated for vertical motion.

Bumper lift plate 40 which is best illustrated in FIG. 6 has a U bracket 41 fixedly attached to the top end thereof, a pair of U slots 42 formed at the top edges thereof for accommodating chains in making an attachment to a tow over the top of the plate and U brackets 43 fixedly attached to the bottom edges thereof through which lengths of chain pass in making an attachment to the tow by way of the underside of the plate. Plate 40 also has a pair of apertures 39 formed therein to provide clearance for standoff brackets 61 which are attached to cradle arms 57 and abut against posts 30. Bumper lift plate 40 is connected to the cross member 32 by means of U bracket 47 which is attached to the back side of plate 40 and which interlocks with U bracket 78 attached to the front side of cross member 32. This provides a loose connection between the two members permitting relative adjustment therebetween at the same time providing a firm holding attachment when plate 40 is lifted by the tow truck lift mechanism.

Post members 30 are cylindrical in configuration and fitted in internal concentricity with each of them is a pivot post 49. Pivot posts 49 are mounted within post members 30 so that they are free to rotate about the longitudinal axes thereof yet are constrained from movement along these longitudinal axes. Pivotally supported on each pivot post 49 by means of a pivot pin 50 is a cradle arm unit 52. When cradle arm units 52 are in position for operation, pivotal motion about the longitudinal axes of pins 50 is prevented by means of locking pins 51 which lock the cradle units to the pivot posts, operating similarly to locking pins 60, illustrated in detail in FIG. 5. When it is desired to place cradle arms 52 back into the position indicated by dotted sketch a (FIG. 4), it is only necessary to release locking pins 51 to permit upward rotation of the cradle arms on pins 50.

Each of cradle arms 52 includes a vertical post section 55 which is fixedly attached at one end thereof to bracket member 56 and at the other end thereof to horizontal arm section 57. Telescopically fitted within each arm section 57 is an extension arm 59. Each of extension arms 59 can be set to any extended position by means of an associated locking pin 58 which mates with apertures 63 formed in the extension arm.

Removably attached to the very end of each extension arm 59 is a support bracket member 65. Support bracket member 65 is attached to extension arm 59 by means of locking pin 60 which is identical in configuration to locking pins 51 and 58. Bracket member 65 is telescopically fitted over extension arm 59 and may be removed therefrom by releasing locking pin 60. Various types of bracket arms 65 may be attached to extension arm 59 as individual application requirements may demand, the support bracket 65 illustrated being just one of several configurations of such support brackets which may be utilized with the device of the invention.

The details of locking pin 60 (and similar locking pins 51 and 58) are illustrated in FIG. 5. As can be seen, such locking pin includes a pin member 70 attached to a plate 69 which is actuated by spring 72. Bracket attachment 65 can be released from extension arm 59 by withdrawing pin member 70 by means of handle 74. Thus, various types of lift attachments 65 can readily be substituted.

Referring now, particularly to FIGS. 3 and 4, cradle arms 52 are raised by means of pull member 70. Pull member 70 includes a pair of chains 71 at the ends thereof, each of said chains having a hook 73 attached thereto for use in connecting the pull member to the vehicle to be towed. Chain members 71 are joined together by cable 75. If so desired, a single continuous chain or cable can be utilized in lieu of the separate chain and cable sections 71 and 75. Pull member 70 is slidably constrained for motion along the longitudinal axes of cradle units 52 by means of U brackets 77 which are fixedly attached to the cradle arms. Cable 75 rides in roller wheels 80 which are rotatably mounted on brackets 81, which in turn are fixedly attached to the cradle arms. The center portion of cable 75 rides on pulley wheel 83. Pulley wheel 83 is rotatably mounted in U bracket 86 to which the lifting mechanism 90 of the tow truck boom is attached when using the cradle device. A standoff post 61 is attached to the corner of each of the cradle arms. These posts have curved faces which mate with the surfaces of posts 30 and act to provide bearings for the cradle arms.

Referring now particularly to FIGS. 1 and 4, the cradle mechanism of the device of the invention is utilized as follows: Cradle units 52 are first rotatably lowered from the position indicated in a to the position indicated in b of FIG. 4. In this lowered position, pin members 51 engage pivot posts 49 to prevent further vertical movement of the cradle arms. The tow truck is then positioned in the approximate position necessary to make the towing attachment. No precise alignment of the tow truck is required. The cradle units 52 are then positioned under the chassis of the tow by rotating each of the cradle arms 57 on its associated pivot post 49, by the extension of arms 59 as necessary and by rotating support until 11 on pivot pin 22. Thus, as can be seen considerable latitude of adjustment is provided so that the cradle arms can be properly aligned without any precise positioning of the tow truck. If desired, hooks 73 can be attached to the vehicle to be towed and the tow truck boom mechanism used to pull the braked vehicle into the cradle support position by means of pull member 70.

With bracket member 65 in the proper position under an appropriate structural member 95 of the vehicle to be towed, hooks 73 are attached to the structure 100 of the vehicle to be towed. Lift mechanism 90 is attached to bracket 86. The cradle unit is then raised by means of the tow truck lift mechanism to the position indicated at c in FIG. 4 and as shown in FIG. 1. This raising action is achieved by pull member 70 which is drawn taut and with further pulling action raises the cradle arms. If so desired, in lieu of using brackets 77, arm sections 57 and 59 of the cradle arm units can be made hollow and the pull member 70 run through the center thereof.

Referring now to FIG. 2, the use of the bumper lift mechanism of the device of the invention is illustrated. In utilizing the bumper lift mechanism, cradle arm units 52 are kept in their stowage position as shown in FIG. 2. Lift mechanism 90 of tow truck boom 101 is connected to U bracket 41 in the top of lift plate 40. Chains 105, each of which passes through an associated one of U brackets 43 in the bottom of the lift plate are attached at one end thereof to the tow mechanism and at the other end to the vehicle 106 to be towed. The plate is then lifted by means of the tow truck lift mechanism to bring the tow into position for towing. Thus, the device may be utilized as a conventional bumper hitch as well as a cradle lift device.

The device of the invention thus provides simple yet highly effective means for operating a tow device either in a bumper hitch configuration or a cradle lift configuration. The device can readily be converted from one type of operation to the other with a minimum amount of time and effort. A unique cradle mechanism is also provided with which it is not necessary to closely align the tow truck with the tow thereby minimizing the skill and time required to operate this mechanism.

While the invention has been described and illustrated in detail, it is to be clearly understood that this is intended by way of illustration and example only and is not to be taken by way of limitation, the spirit and scope of the invention being limited only by the terms of the following claims.

I claim:

1. In a device for connecting a vehicle to be towed to the lift mechanism of a tow truck,
   a support unit connected to said tow truck for pivotal motion about a substantially vertical axis and about a substantially horizontal axis,
   a cradle unit connected to said support unit, said cradle unit including a pair of arm means, pivot support means for each of said arm means, and means for attaching each of said cradle arm means to said pivot support means for pivotal motion about a horizontal axis each of said pivot support means being mounted on said support unit for pivotal motion about a vertical axis,
   pull means for lifting said arm means vertically, the center portion of said pull means being attached to said lift mechanism, the ends of said pull means being attached to said vehicle to be towed, said pull means running along substantially the entire longitudinal extent of both of said arm means, and
   means for slidably holding said pull means to said arm means for motion along the longitudinal axes thereof and otherwise constrained relative to said arm means along substantially the entire longitudinal extent thereof.

2. The device as recited in claim 1 wherein said means for holding said pull means includes a plurality of U brackets extending from said arm means.

3. The device as recited in claim 1 wherein each of said arm means includes a fixed arm section, an extension arm section telescopically fitted on said fixed arm section and support bracket means removably attached to the end of said extension arm section.

4. The device as recited in claim 1 wherein said pull means includes a cable section, a chain section attached to each of the ends of said cable section, and a hook attached to the ends of each of said chain sections, said hooks being attached to said vehicle.

5. In a device for connecting a vehicle to be towed to the lift mechanism of a tow truck,
   a support unit connected to said tow truck for pivotal motion about a substantially vertical axis, said support unit including arm means, means for supporting said arm means for pivotal motion about a substantially horizontal axis and post means pivotally attached to the ends of said arm means,
   a cradle unit connected to said support unit, said cradle unit including a pair of arm means, and means for supporting each of said arm means for pivotal motion about a horizontal axis and about a vertical axis, each of said arm support means being rotatably mounted in an associated one of said post means,
   pull means for lifting said cradle arm means vertically, said pull means being attached to said lift mechanism and to said vehicle to be towed, said pull means running along substantially the entire longitudinal extent of said cradle arm means, and
   means for constraining a substantial portion of said pull means along substantially the entire longitudinal extent of said cradle arm means so as to prevent any substantial motion thereof relative to said cradle arm means except along the longitudinal axes of said cradle arm means.

6. The device as recited in claim 5 wherein said pull means includes a hook at each of the opposite ends thereof, said hooks being attached to said vehicle.

7. In a device for connecting a vehicle to be towed to the lift mechanism of a tow truck,
   a support unit connected to said tow truck for pivotal motion about a substantially vertical axis, said support unit including post member means, arm means mounted on said post member means for pivotal motion about a substantially horizontal axis and post means pivotally attached to the ends of said arm means,
   a cradle unit connected to said support unit, said cradle unit including a pair of arm means, pivot support means for each of said arm means, and means for attaching each of said cradle arm means to said pivot support means for pivotal motion about a horizontal axis each of said pivot support means being mounted in an associated one of said post means for pivotal motion about a substantially vertical axis, and
   pull means for lifting said cradle arm means vertically, the center portion of said pull means being attached to said lift mechanism, the ends of said pull means being attached to said vehicle to be towed, said pull means running along substantially the entire longitudinal extent of both of said cradle arm means, and
   means for constraining said pull means relative to said cradle arm means along substantially the entire longitudinal extent thereof except as to motion substantially along the longitudinal axes thereof.

8. The device as recited in claim 7 wherein said means for constraining said pull means includes a plurality of U brackets fixedly attached to said cradle arm means.

9. The device as recited in claim 7 wherein each of said cradle arm means includes a fixed arm section an extension arm section telescopically fitted on said fixed arm section, and locking pin means for joining said arm sections together at one of several predetermined extension positions.

10. The device as recited in claim 7 wherein said pull means includes a pair of chains at opposite ends thereof, a cable joining said chains together and a hook attached to the free end of each of said chains.

11. A device for connecting a vehicle to be towed to a towing vehicle comprising
    a support unit, said support unit including arm means articulated for vertical motion and support posts attached to the ends of said arm means,
    means for attaching said support unit to said towing vehicle for pivotal motion about a vertical axis,
    a cradle unit attached to the ends of the support posts of said support unit, said cradle unit including a pair of cradle arm means and means mounted on said support posts for separately supporting each of said cradle arm means for independent pivotal motion about both a vertical axis and a horizontal axis,
    pull means for drawing said cradle unit upward, said pull means including cable means running along substantially the entire extent of the longitudinal axes of said cradle arm means,
    said cradle unit further including means for constraining said pull means relative to said cradle arm means along substantially the entire longitudinal extent thereof except as to motion along said longitudinal axes,
    a lift mechanism mounted on said towing vehicle, and
    means for connecting said lift mechanism to the center portion of said pull means.

12. The device as recited in claim 11 wherein each of said cradle arm means includes a fixed arm section, an extension arm section telescopically fitted on said fixed arm section, and support bracket means removably attached to the end of said extension arm section.

13. A device for connecting a vehicle to be towed to a towing vehicle comprising
    a support unit, said support unit including arm means articulated for vertical motion and support posts attached to the end of said arm means,
    means for attaching said support unit to said towing vehicle for pivotal motion about a vertical axis, a cradle unit attached to the ends of the support posts of said support unit, said cradle unit including a pair of cradle arm means and means mounted on said support posts for separately supporting each of said cradle arm means for independent pivotal motion about both a vertical axis and a horizontal axis, bumper lift plate means, means for loosely attaching said lift plate means to said support unit, pull means for drawing said cradle unit upward, said pull means including a cable running along the longitudinal axes of said cradle arm means, said cradle unit further including means for constraining said pull means relative thereto except as to motion along said longitudinal axes, a lift mechanism mounted on said towing vehicle, and means for alternatively connecting said lift mechanism to the center portion of said pull means or to said bumper lift plate means.

14. The device as recited in claim 13 wherein said means for supporting said cradle arm means includes a pivot post rotatably mounted in each of said support posts for rotation about a first axis and means for pivotally mounting each of said cradle arms on a respective one of said pivot posts for rotation about a second axis normal to said first axis.

15. A device for connecting a vehicle to be towed to a towing vehicle comprising a support unit, means for attaching said support unit to said towing vehicle for pivotal motion about a vertical axis, a cradle unit attached to the ends of said support unit, said cradle unit including a pair of cradle arm means and means mounted on said support unit for separately supporting each of said cradle arm means for independent pivotal motion about both a vertical axis and a horizontal axis, pull means for drawing said cradle unit upward, said pull means including a pull member running along the longitudinal axes of said cradle arm means, said cradle unit further including means for constraining said pull member relative thereto except as to motion along said longitudinal axes, a lift mechanism mounted on towing vehicle, means for connecting said lift mechanism to the center portion of said pull member, bumper lift plate means, and means for loosely attaching said lift plate means to said support unit.

16. In a device for connecting a vehicle to be towed to the lift mechanism of a tow truck, a support unit connected to said tow truck for pivotal motion about a substantially vertical axis, said support unit including arm means, means for supporting said arm means for pivotal motion about a substantially horizontal axis and post means pivotally attached to the ends of said arm means, a cradle unit connected to said support unit, said cradle unit including a pair of arm means, and means for supporting each of said arm means for pivotal motion about a horizontal axis and about a vertical axis, each of said arm support means being rotatably mounted in an associated one of said post means, pull means for lifting said cradle arm means vertically, said pull means being attached to said lift mechanism and to said vehicle to be towed, means for constraining a substantial portion of said pull means along the longitudinal extend of said cradle arm means so as to prevent any substantial motion thereof relative to said cradle arm means except along the longitudinal axes of said cradle arm means, bumper lift plate means, and means for loosely attaching said lift plate means to said support unit.

References Cited by the Examiner

UNITED STATES PATENTS

| | | | |
|---|---|---|---|
| 2,183,478 | 12/1939 | Holmes et al. | 214—86 |
| 2,726,777 | 12/1955 | Wiley | 214—86 |
| 2,782,944 | 2/1957 | Macklin | 214—86 |
| 2,796,183 | 6/1957 | Cline et al. | 214—86 |
| 3,048,286 | 8/1962 | Sprague | 214—86 |
| 3,182,828 | 5/1965 | Ormsby | 214—86 |

MARVIN A. CHAMPION, *Primary Examiner.*

ALBERT J. MAKAY, *Examiner.*